United States Patent
Herion et al.

(10) Patent No.: US 9,187,900 B2
(45) Date of Patent: Nov. 17, 2015

(54) CONNECTION ARRANGEMENT FROM HOLLOW STEEL SECTIONS WHICH ARE SUBJECT TO AXIAL PRESSURE

(75) Inventors: Stefan Herion, Berg (DE); Ole Josat, Leverkusen (DE)

(73) Assignee: V & M DEUTSCHLAND GMBH, Düsseldorf (DE)

( * ) Notice: Subject to any disclaimer, the term of this patent is extended or adjusted under 35 U.S.C. 154(b) by 0 days.

(21) Appl. No.: 13/520,468

(22) PCT Filed: Dec. 3, 2010

(86) PCT No.: PCT/DE2010/001432
§ 371 (c)(1),
(2), (4) Date: Feb. 7, 2013

(87) PCT Pub. No.: WO2011/079832
PCT Pub. Date: Jul. 7, 2011

(65) Prior Publication Data
US 2013/0125496 A1    May 23, 2013

(30) Foreign Application Priority Data
Jan. 4, 2010   (DE) .................... 10 2010 004 155

(51) Int. Cl.
| E04C 3/08 | (2006.01) |
| E04C 5/065 | (2006.01) |
| F16B 7/00 | (2006.01) |
| E04C 3/04 | (2006.01) |
| F16B 7/04 | (2006.01) |

(52) U.S. Cl.
CPC . *E04C 3/08* (2013.01); *E04C 5/065* (2013.01); *F16B 7/00* (2013.01); *E04C 2003/0417* (2013.01); *E04C 2003/0491* (2013.01); *F16B 7/0413* (2013.01); *Y10T 403/472* (2015.01); *Y10T 403/70* (2015.01); *Y10T 403/7062* (2015.01); *Y10T 403/7064* (2015.01)

(58) Field of Classification Search
CPC ... E04C 3/08; E04C 5/065; E04C 2003/0417; E04C 2003/0491; F16B 7/00; F16B 7/0413
USPC ........ 52/634, 636, 638, 653.2, 693, 694, 696, 52/697; 403/267, 345, 373, 374.1
See application file for complete search history.

(56) References Cited

U.S. PATENT DOCUMENTS

| 2,452,219 | A | * | 10/1948 | Lennart et al. ................ 285/317 |
| 2,457,908 | A | * | 1/1949 | Meyerhoefer .................... 285/7 |
| 2,741,498 | A | * | 4/1956 | Marvel ..................... 285/148.11 |
| 2,910,314 | A | * | 10/1959 | Klein ............................. 403/174 |
| 2,982,572 | A | * | 5/1961 | Farber .......................... 403/219 |
| 3,156,329 | A | * | 11/1964 | Jacques ........................... 52/638 |
| 3,494,640 | A | * | 2/1970 | Brown et al. ................. 285/115 |
| 3,589,873 | A | * | 6/1971 | Poth .............................. 428/600 |

(Continued)

FOREIGN PATENT DOCUMENTS

| CH | 343717 | 2/1960 |
| DE | 24 03 832 | 8/1975 |

(Continued)

*Primary Examiner* — Rodney Mintz
(74) *Attorney, Agent, or Firm* — Henry M. Feiereisen LLC

(57) ABSTRACT

The invention relates to a connection arrangement of hollow steel sections as support elements which are interconnected using a joint connection, the connection being subject to axial pressure. According to the invention, the joint connection is designed as a detachable, form-fitting plug-in connection.

10 Claims, 4 Drawing Sheets

(56) References Cited

U.S. PATENT DOCUMENTS

| | | | |
|---|---|---|---|
| 3,606,403 A * | 9/1971 | Medney | 285/334.4 |
| 3,635,505 A * | 1/1972 | Osterhagen et al. | 285/345 |
| 3,882,650 A * | 5/1975 | Gugliotta | 52/223.12 |
| 3,909,045 A * | 9/1975 | Meagher | 285/22 |
| 3,968,982 A * | 7/1976 | Belicic | 285/289.1 |
| 4,092,077 A * | 5/1978 | George | 403/178 |
| 4,095,825 A * | 6/1978 | Butler | 285/55 |
| 4,120,083 A * | 10/1978 | Echols | 29/458 |
| 4,161,088 A * | 7/1979 | Gugliotta et al. | 52/223.12 |
| 4,269,438 A * | 5/1981 | Ridenour | 285/382.2 |
| 4,302,874 A * | 12/1981 | Colas | 29/426.6 |
| 4,442,650 A | 4/1984 | Sivachenko | |
| 4,546,591 A * | 10/1985 | Beltz | 52/645 |
| 4,569,617 A * | 2/1986 | Schmidt et al. | 405/251 |
| 4,598,922 A * | 7/1986 | Kleinebenne et al. | 280/279 |
| 4,627,146 A * | 12/1986 | Ward | 29/458 |
| 4,645,247 A * | 2/1987 | Ward | 285/382.1 |
| 4,696,499 A * | 9/1987 | Butler | 285/334.4 |
| 4,715,739 A * | 12/1987 | Ruegg et al. | 403/30 |
| 4,958,953 A * | 9/1990 | Charondiere | 403/297 |
| 4,991,371 A * | 2/1991 | Preuss et al. | 52/653.2 |
| 5,003,748 A * | 4/1991 | Carr | 52/693 |
| 5,052,848 A * | 10/1991 | Nakamura | 403/268 |
| 5,090,837 A * | 2/1992 | Mower | 403/334 |
| 5,324,133 A * | 6/1994 | Kreis et al. | 403/270 |
| 5,406,767 A * | 4/1995 | Pech et al. | 52/638 |
| 5,498,096 A * | 3/1996 | Johnson | 403/267 |
| 5,511,831 A * | 4/1996 | Barton | 285/382 |
| 5,685,577 A * | 11/1997 | Vanesky | 285/294.3 |
| 5,944,441 A * | 8/1999 | Schutze | 403/403 |
| 5,956,917 A * | 9/1999 | Reynolds | 52/655.1 |
| 6,073,417 A * | 6/2000 | Hackett | 52/745.09 |
| 6,148,581 A * | 11/2000 | Separautzki | 52/653.2 |
| 6,227,752 B1 * | 5/2001 | Friedrich | 403/192 |
| 6,287,042 B1 * | 9/2001 | Eriksson | 403/267 |
| 6,742,258 B2 * | 6/2004 | Tarbutton et al. | 29/897 |
| 6,758,022 B1 * | 7/2004 | Coll et al. | 52/690 |
| 6,892,502 B1 * | 5/2005 | Hubbell et al. | 52/633 |
| 7,037,024 B2 * | 5/2006 | Steinwender | 403/267 |
| 7,076,855 B2 * | 7/2006 | Gunther | 29/522.1 |
| 7,127,816 B2 * | 10/2006 | Kiehl | 29/897.2 |
| 7,175,204 B2 * | 2/2007 | Tarbutton et al. | 280/785 |
| 7,754,046 B2 * | 7/2010 | Bottacin | 156/296 |
| 8,011,162 B2 * | 9/2011 | Overby | 52/745.17 |
| 8,028,488 B2 * | 10/2011 | Dodd | 52/645 |
| 8,302,368 B1 * | 11/2012 | Keel | 52/843 |
| 8,865,061 B2 * | 10/2014 | Kaucke et al. | 420/111 |
| 2002/0020134 A1 * | 2/2002 | Collard | 52/694 |
| 2002/0037192 A1 * | 3/2002 | Eriksson | 403/267 |
| 2002/0056248 A1 * | 5/2002 | Warren | 52/648.1 |
| 2003/0126828 A1 * | 7/2003 | Cook et al. | 52/741.1 |
| 2003/0217521 A1 | 11/2003 | Richardson et al. | |
| 2005/0044810 A1 * | 3/2005 | Schipani et al. | 52/636 |
| 2005/0252153 A1 * | 11/2005 | Barmakian et al. | 52/693 |
| 2009/0152866 A1 * | 6/2009 | Mutschlechner et al. | 285/377 |
| 2010/0326003 A1 * | 12/2010 | Davies | 52/641 |
| 2011/0158741 A1 * | 6/2011 | Knaebel | 403/265 |
| 2011/0173918 A1 * | 7/2011 | Graham | 52/693 |
| 2011/0315277 A1 * | 12/2011 | Kaucke et al. | 148/335 |
| 2012/0211978 A1 * | 8/2012 | Gardiner | 285/382 |
| 2014/0301775 A1 * | 10/2014 | Ehrlich et al. | 403/267 |
| 2014/0308067 A1 * | 10/2014 | Boudeman | 403/205 |
| 2014/0334871 A1 * | 11/2014 | Beneken et al. | 403/345 |
| 2014/0376995 A1 * | 12/2014 | Faass et al. | 403/267 |
| 2015/0003894 A1 * | 1/2015 | Legg | 403/14 |

FOREIGN PATENT DOCUMENTS

| | | | |
|---|---|---|---|
| DE | 198 05 653 A1 | 8/1999 | |
| DE | 102006010951 | 9/2007 | |
| EP | 2521827 B1 * | 4/2014 | |
| GB | 1 223 050 | 2/1971 | |
| WO | WO 01/14658 A1 | 3/2001 | |
| WO | WO 2006/074439 A2 | 7/2006 | |
| WO | WO 2007098727 A1 * | 9/2007 | |

* cited by examiner

CONNECTION ARRANGEMENT FROM HOLLOW STEEL SECTIONS WHICH ARE SUBJECT TO AXIAL PRESSURE

CROSS-REFERENCES TO RELATED APPLICATIONS

This application is the U.S. National Stage of International Application No. PCT/DE2010/001432, filed Dec. 3, 2010, which designated the United States and has been published as International Publication No. WO 2011/079832 A1 and which claims the priority of German Patent Application, Serial No. 10 2010 004 155.6, filed Jan. 4, 2010, pursuant to 35 U.S.C. 119(a)-(d).

BACKGROUND OF THE INVENTION

The invention relates to a connection arrangement of hollow steel sections which are subject to axial pressure.

Hollow steel sections which are subject to axial pressure are for example used in framework constructions, which are used inter alia as roof structures for pre fabricated carrier systems and are known from DE 10 2006 010 951 A1.

The support system for roof constructions made of steel which is shown here which is also offered under the name "PREON"®, is characterized in particular by its variability in the adjustment to different span widths. This variability is realized through a standardization and modulization of the construction and only requires one type static.

Such support systems for framework constructions are composed of different interconnected support elements which are configured as hollow sections, and which are subjected to tensile stresses, pressure stresses or bending stresses in accordance with the stress exerted on them. These support sections are configured as upper chord or respectively, lower chord and diagonal beams of different lengths, which are subsequently interconnected via joint connections.

The length of the individual support elements is limited for shipping or also production technical reasons, so that in order to produce the lengths which are required for producing the framework constructions, the support elements have to be connected to multiple lengths from case to case.

The joint connections of the support elements are realized by means of head plate connections, which are usually produced by welding and by means of mechanical connection elements, such as screws or rivets.

These connection techniques require a high effort and are expensive and are not required in connections which are exclusively subjected to axial pressure, and are therefore uneconomical.

SUMMARY OF THE INVENTION

The invention is based on the object, to provide a connection of hollow steel profiles which are subject to axial pressure which can be produced cost effectively and fast without the disadvantages of known connections.

This object is solved with a connection arrangement from hollow steel sections as support elements, which are connected to one another by means of joint connections and the connection is subjected to an axial pressure load, wherein the joint connection is configured as releasable form fitting plug-in connection. Advantageous refinements are the subject matter of the sub claims.

According to the teaching of the invention, this object is solved by configuring the joint connection which is subjected to pressure as detachable form fitting plug in connection. In joint connections which are only subjected to axial pressure, for example in framework constructions, this plug-in connection has significant advantages compared to the previously common welding, screwing, and riveting connections.

Because the connections are subjected to pressure only axially, it is sufficient from a statics point of view to realize the required lengths of the diagonal elements via simple plug-in connections of hollow sections which are inserted into one another. This makes the mounting of the framework construction significantly simpler, faster and with this more economical.

In a first embodiment, for producing the plug-in connections, the hollow sections of the diagonal beams have on one end of the one subsection of the diagonal beam an increased diameter, wherein the end of the other subsection of the diagonal beam which is to be inserted into the one end has a constant diameter.

In a second embodiment, for producing the plug-in connection, one end of a subsection of the diagonal beam has a reduced diameter and the diameter of the end of the other subsection of the diagonal beam which is pushed onto the one end remains constant.

In a further advantageous embodiment of the invention, the connection is produced by means of a separate sleeve which is provided with a widening and a tapering, so that the hollow sections can be manufactured with a constant diameter. The sleeve is inserted into an end of the hollow section and pushed onto the end of the other hollow section.

This has the advantage that the sleeves can be manufactured as cost effective standard elements. However, sleeves whose ends are respectively pushed onto or respectively inserted into the ends of the hollow sections are also conceivable.

In an advantageous embodiment of the invention, the plug-in connection is provided with a safeguard against unintended release. This can for example be an adhesive, mortar or a clamping element, such as for example a wedge 9 or a clamping ring 8.

The hollow sections of the support elements according to the invention are produced from hot finished, seamless pipes, however, hollow sections from welded, cold or hot finished pipes can also be used.

Although the invention is described by way of an example of a framework construction, it can generally also be used in steel construction and machine construction or in façade engineering, wherever connections from pipes or respectively hollow sections, which are only subjected to pressure are to be produced.

BRIEF DESCRIPTION OF THE DRAWINGS

In the following figures, the invention is explained by way of exemplary embodiments.

DETAILED DESCRIPTION OF PREFERRED EMBODIMENTS

Figure 1:
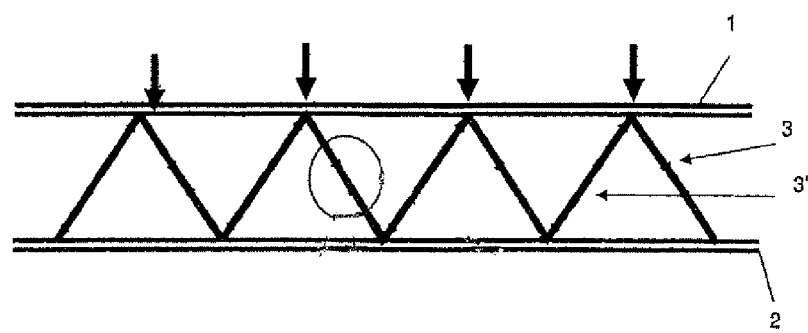
FIG. 1 a schematic representation of a framework construction.

FIG. 1 shows a framework construction according to the invention which has been produced from hollow sections with an upper chord 1, a lower chord 2 and diagonal beams 3, 3' as support elements. The support elements themselves are composed of seamlessly rolled hollow sections, which are connected to one another to multiple lengths according to the required length.

In framework constructions which are subjected to load (see load arrows) the diagonal beams 3, 3' behave as pressure bar 3 or respectively, tension 3' bar. In diagonal beams which, due to the required length are subdivided, the connections of the beams which are only subjected to axial pressure are configured as form-fitting plug-in connection. The other support elements of the framework construction on the other hand, are connected to one another in a conventional manner with welded on head plate connections (not shown here), so that tensile loads can be absorbed by the connection.

Figure 2:
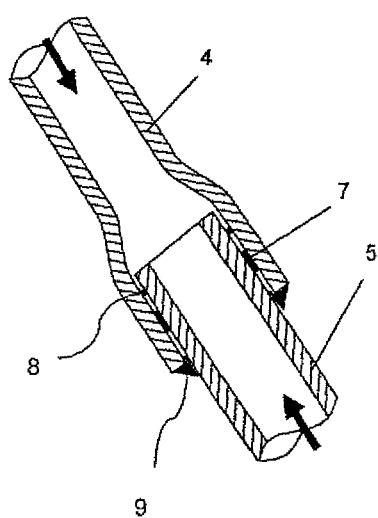
FIG. 2 a sectional view of the encircled region of FIG. 1 showing an embodiment of the invention.

FIG. 2 shows an embodiment of the invention as form-fitting plug-in connection.

The diagonal beams 3 which are subjected to axial compressive stress are composed in a first embodiment (FIG. 2) of two subsections 4, 5 due to the required length. The subsection 4 has on one end an increased diameter, which is dimensioned so that the end of the subsection 5 of the diagonal beam 3 which is to be inserted into the subsection 4 can be form-fittingly received.

For safeguarding against unintended release of the connection, the connection is fixed with an adhesive 7. Instead of the adhesive mortar or the like can be used.

Figure 3:
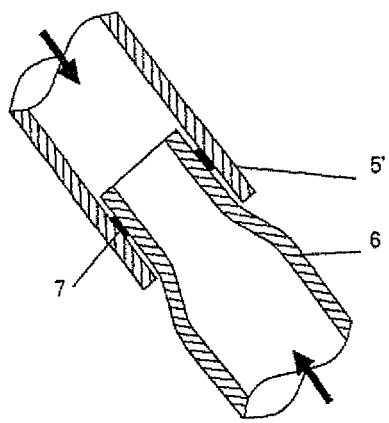
FIG. 3 a sectional view of the encircled region of FIG. 1 showing another embodiment of the invention.
Figure 4:
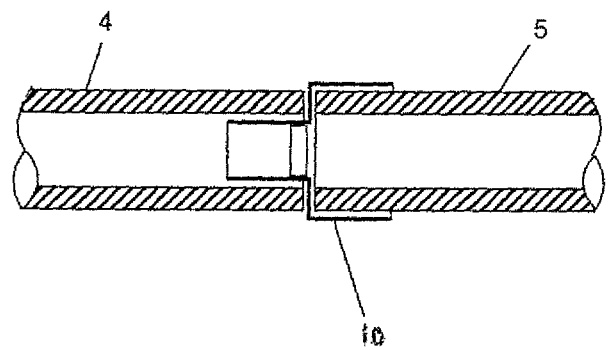
FIG. 4 a sectional view of the encircled region of FIG. 1 showing yet another embodiment of the invention.

FIG. 3 shows another embodiment of the plug-in connection in which the diagonal beam 3 is divided into subsections 5', and 6. In this variant, the section 6 is reduced in diameter at one end and form fittingly inserted into the subsection 5', which has constant diameter throughout. This connection is also secured against unintended release with adhesive or mortar or similarly secured. FIG. 4 shows another embodiment the plugin connection in which the connection is implemented with a sleeve 10.

By introducing adhesive, mortar, clamping elements or the like the transfer of torques (bending moments and torsional moments) is possible.

The invention claimed is:

1. A framework construction, comprising:
    support elements constructed as hollow steel sections, said hollow steel sections forming an upper chord, a lower chord and diagonal beams of the framework construction, wherein at least the diagonal beams are comprised of subsections,
    a sleeve interconnecting the subsections,
    wherein a first end of the sleeve is form fittingly received in an end of one of the subsections, and an end of another one of the subsections is form fittingly received in a second end of the sleeve resulting in a form fitting plug-in joint connection,
    wherein said joint connection is subjected to an axial pressure load that permits axial movement of the one of the subsections relative to the another one of the subsections, and
    wherein said joint connection does not comprise fastening elements that prevent said axial movement.

2. A framework construction, comprising:
    support elements constructed as hollow steel sections, said hollow steel sections forming an upper chord, a lower chord and diagonal beams of the framework construction, wherein at least the diagonal beams are comprised of subsections,
    wherein one of the subsections has a first inner diameter and a terminal section with a narrower second inner diameter, said terminal section being defined by a length, said second inner diameter extending along an entirety of said length, said first inner diameter continuously transitioning into said second inner diameter,
    wherein another one of the subsections has an end with a constant inner diameter, said end detachably receiving the terminal section of the one of the subsections along the entirety of the length of the terminal section resulting in a form fitting plug-in joint connection,
    wherein said joint connection is subjected to an axial pressure load that permits axial movement of the one of the subsections relative to the another one of the subsections, and
    wherein said joint connection does not comprise fastening elements that prevent said axial movement.

3. A framework construction, comprising:
    support elements constructed as hollow steel sections, said hollow steel sections forming an upper chord, a lower chord and diagonal beams of the framework construction, wherein at least the diagonal beams are comprised of subsections,
    wherein one of the subsections has a first inner diameter and a terminal section with a wider second inner diameter, said terminal section being defined by a length, said second inner diameter extending along an entirety of said length, said first inner diameter continuously transitioning into said second inner diameter,
    wherein another one of the subsections has an end with a constant outer diameter, said end being detachably received in the terminal section of the one of the subsections along the entirety of the length of the terminal section resulting in a form fitting plug-in joint connection,
    wherein said joint connection is subjected to an axial pressure load that permits axial movement of the one of the subsections relative to the another one of the subsections, and
    wherein said joint connection does not comprise fastening elements that prevent said axial movement.

4. The framework construction of claim 3, wherein the hollow sections which form the upper chord, the lower chord and the diagonal beams of the framework construction are produced from welded, cold or hot finished seamless pipes.

5. The framework construction of claim 3, wherein the hollow sections which form the upper chord, the lower chord and the diagonal beams of the framework construction are produced from hot finished seamless pipes.

6. The framework construction of claim 3, further comprising a safeguard against unintentional release of the subsections.

7. The framework construction of claim 6, wherein the safeguard is an adhesive.

8. The framework construction of claim 6, wherein the safeguard is a clamping element.

9. The framework construction of claim 8 wherein the clamping element is a wedge.

10. The framework construction of claim 8, wherein the clamping element is a clamping ring.

\* \* \* \* \*